United States Patent
Krok et al.

(10) Patent No.: US 8,816,531 B2
(45) Date of Patent: Aug. 26, 2014

(54) SYSTEMS, METHODS, AND APPARATUS FOR INTEGRATED VOLT/VAR CONTROL IN POWER DISTRIBUTION NETWORKS

(75) Inventors: Michael Joseph Krok, Niskayuna, NY (US); Wei Ren, Niskayuna, NY (US); Sahika Genc, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 784 days.

(21) Appl. No.: 13/100,015

(22) Filed: May 3, 2011

(65) Prior Publication Data

US 2012/0193984 A1 Aug. 2, 2012

Related U.S. Application Data

(63) Continuation-in-part of application No. 13/014,779, filed on Jan. 27, 2011, now Pat. No. 8,648,499.

(51) Int. Cl.
*H02J 3/18* (2006.01)
*H02J 13/00* (2006.01)
*H02J 3/00* (2006.01)

(52) U.S. Cl.
CPC ............... *H20J 3/1807* (2013.01); *Y02E 40/30* (2013.01); *H02J 3/1878* (2013.01); *Y04S 10/22* (2013.01); *Y04S 10/54* (2013.01); *H02J 2003/003* (2013.01); *H02J 13/0079* (2013.01)
USPC .......................................................... 307/31

(58) Field of Classification Search
USPC .......................................................... 307/31
See application file for complete search history.

(56) References Cited

U.S. PATENT DOCUMENTS

| | | |
|---|---|---|
| 3,883,724 A | 5/1975 | Pradhan et al. |
| 4,868,410 A | 9/1989 | Nakamura |
| 5,483,462 A | 1/1996 | Chiang |
| 5,498,954 A | 3/1996 | Bassett et al. |
| 5,517,423 A | 5/1996 | Pomatto |
| 5,594,659 A | 1/1997 | Schlueter |
| 5,608,646 A | 3/1997 | Pomatto |

(Continued)

FOREIGN PATENT DOCUMENTS

| | | |
|---|---|---|
| JP | 7321834 | 12/1995 |
| WO | 9633544 A1 | 10/1996 |
| WO | 2006011956 A2 | 2/2006 |

OTHER PUBLICATIONS

R. Berg, Jr., E. S. Hawkins, and W. W. Pleines, "Mechanized Calculation of Unbalanced Load Flow on Radial Distribution Circuits", IEEE Transactions on Power Apparatus and Systems, vol. PAS-86, No. 4, Apr. 1967, pp. 415-421.

(Continued)

*Primary Examiner* — Jared Fureman
*Assistant Examiner* — Duc M Pham
(74) *Attorney, Agent, or Firm* — Nitin N. Joshi

(57) ABSTRACT

Certain embodiments of the invention may include systems, methods, and apparatus for controlling voltage and reactive power in a distribution network. One method includes estimating at least one present state associated with a distribution network; allocating one or more load zones in the distribution network; predicting load profiles of each zone for a predetermined time period; determining capacitor bank switching schedules for a predetermined time period based at least in part on the at least one present state and the predicted load profiles; and switching capacitor banks according to the capacitor bank switching schedules.

23 Claims, 5 Drawing Sheets

(56) References Cited

U.S. PATENT DOCUMENTS

| | | | |
|---|---|---|---|
| 5,610,834 A | 3/1997 | Schlueter | |
| 5,642,000 A | 6/1997 | Jean-Jumeau et al. | |
| 5,694,329 A | 12/1997 | Pomatto | |
| 5,796,628 A | 8/1998 | Chiang et al. | |
| 5,825,162 A | 10/1998 | Kida et al. | |
| 5,841,267 A | 11/1998 | Larsen | |
| 6,011,324 A | 1/2000 | Kohlstruck et al. | |
| 6,018,449 A | 1/2000 | Nelson et al. | |
| 6,111,735 A | 8/2000 | Nelson et al. | |
| 6,126,260 A | 10/2000 | Lan et al. | |
| 6,168,325 B1 | 1/2001 | Nagata | |
| 6,243,244 B1 | 6/2001 | Nelson et al. | |
| 6,347,027 B1 | 2/2002 | Nelson et al. | |
| 6,625,520 B1 | 9/2003 | Chen et al. | |
| 6,697,240 B2 | 2/2004 | Nelson et al. | |
| 6,757,628 B1 | 6/2004 | Anderson et al. | |
| 6,775,597 B1 | 8/2004 | Ristanovic et al. | |
| 6,924,627 B1 | 8/2005 | Wobben | |
| 7,069,117 B2 | 6/2006 | Wilson et al. | |
| 7,096,175 B2 | 8/2006 | Rehtanz et al. | |
| 7,117,070 B2 | 10/2006 | Chow et al. | |
| 7,288,921 B2 | 10/2007 | Huff et al. | |
| 7,321,834 B2 | 1/2008 | Chu et al. | |
| 7,385,300 B2 | 6/2008 | Huff et al. | |
| 7,462,947 B2 | 12/2008 | Wobben | |
| 7,474,080 B2 | 1/2009 | Huff et al. | |
| 7,519,506 B2 | 4/2009 | Trias | |
| 7,544,070 B2 | 6/2009 | Spengler | |
| 2004/0158417 A1 | 8/2004 | Bonet | |
| 2005/0071050 A1 | 3/2005 | Chow et al. | |
| 2006/0111860 A1 | 5/2006 | Trias | |
| 2007/0027642 A1 | 2/2007 | Chu et al. | |
| 2008/0258559 A1 | 10/2008 | Berggren et al. | |
| 2009/0228154 A1 | 9/2009 | Trias | |
| 2010/0198422 A1* | 8/2010 | Feng | 700/291 |
| 2011/0169461 A1* | 7/2011 | Deaver, Sr. | 323/209 |
| 2012/0022713 A1* | 1/2012 | Deaver et al. | 700/298 |
| 2012/0133209 A1* | 5/2012 | O'Brien et al. | 307/72 |

OTHER PUBLICATIONS

William H. Kersting, "Distribution System Modeling and Analaysis," 2nd Edition, CRC Press, Taylor & Francis Group, ISBN 0-8493-5806-X, 2006, pp. 324-344.

H. D. Chiang, "A Decoupled Load Flow Method for Distribution Power Networks: Algorithms, Analysis and Convergence Study", Electrical Power & Energy Systems, vol. 13, No. 3, Jun. 1991, pp. 130-138.

R. D. Zimmerman and H. D. Chiang, "Fast Decoupled Power Flow for unbalanced Radial Distribution Systems", IEEE/PES 1995 Winter Meeting, New York, NY, Jan. 1995, 95 WM 219-6 PWRS.

Search Report and Written Opinion from corresponding EP Application No. 12166232.4-2210 dated Sep. 5, 2012.

\* cited by examiner

SYSTEMS, METHODS, AND APPARATUS FOR INTEGRATED VOLT/VAR CONTROL IN POWER DISTRIBUTION NETWORKS

This application claims the benefit of U.S. Ser. No. 13/014,779, entitled "Systems, Methods, and Apparatus for Accelerating Volt/VAR Load Flow Optimization," filed Jan. 27, 2011, the contents of which are incorporated herein by reference.

This application also claims the benefit of U.S. Ser. No. 13/095,263 entitled "Systems, Methods, and Apparatus for Coordinated Volt/VAR Control in Power Distribution Networks," filed Apr. 27, 2011, the contents of which are incorporated herein by reference.

FIELD OF THE INVENTION

This invention generally relates to power distribution networks, and in particular, to systems, methods, and apparatus for integrated volt/VAR control in power distribution networks.

BACKGROUND OF THE INVENTION

Electric distribution grids (including microgrids) are typically operated with a number of constraints that allow delivery of power at a certain quality and reliability level. A goal associated with operating a power distribution network, for example, is establishing acceptable voltage conditions for all customers while delivering power as efficiently as possible. In many power distribution networks, the voltage profile along the distribution feeder and the flow of reactive power (also known as VARs) on the feeder are typically maintained by a combination of voltage regulators and switched capacitor banks installed at various locations on the feeder and in its associated substation.

Large distribution systems may include microgrids and non-microgrid branches. A microgrid typically includes localized groupings of loads, generation sources, and storage devices that are connected to a traditional centralized grid, or macrogrid. Optimizing an entire feeder network, including microgrids, and coordinating voltage and volt-amps-reactive (VAR) control can be a formidable task, particularly when network conditions change. Traditionally, feeder voltage regulators and switched capacitor banks are operated as independent devices, with no direct coordination between the individual controllers. Such an approach can be effective for maintaining acceptable voltage and reactive power flow near the controllers, but typically does not produce optimal results for the entire feeder.

BRIEF SUMMARY OF THE INVENTION

Some or all of the above needs may be addressed by certain embodiments of the invention. Certain embodiments of the invention may include systems, methods, and apparatus for integrated volt/VAR control in power distribution networks.

According to an example embodiment of the invention, a method is provided for controlling voltage and reactive power in a distribution network. The method includes estimating at least one present state associated with a distribution network; allocating one or more load zones in the distribution network; predicting load profiles of each zone for a predetermined time period; determining capacitor bank switching schedules for a predetermined time period based at least in part on the at least one present state and the predicted load profiles; switching capacitor banks according to the capacitor bank switching schedules; running a power flow algorithm to determine the predicted voltages over all nodes in a zone based at least in part on the predicted load profiles; determining an initial set of voltage regulator tap settings that flattens the predicted average voltage of all nodes in a zone over a given time period based at least in part on a linear relation between tap ratios and voltages; determining a final set of voltage regulator tap settings based on a dynamic programming algorithm; determining voltage regulator switching schedules based at least in part on one or more of the initial or final voltage regulator tap settings; and switching the voltage regulator tap settings according to the voltage regulator switching schedules.

According to another example embodiment, a system is provided. The system includes at least one power distribution network comprising one or more switchable capacitor banks and one or more adjustable voltage regulators. The system also includes at least one memory for storing data and computer-executable instructions; and at least one processor configured to access the at least one memory and further configured to execute the computer-executable instructions for controlling voltage and reactive power (VARs) in the distribution network by: estimating at least one present state associated with a distribution network; allocating one or more load zones in the distribution network; predicting load profiles of each zone for a predetermined time period; determining capacitor bank switching schedules for a predetermined time period based at least in part on the at least one present state and the predicted load profiles; switching capacitor banks according to the capacitor bank switching schedules; running a power flow algorithm to determine the predicted voltages over all nodes in a zone based at least in part on the predicted load profiles; determining an initial set of voltage regulator tap settings that flattens the predicted average voltage of all nodes in a zone over a given time period based at least in part on a linear relation between tap ratios and voltages; determining a final set of voltage regulator tap settings based on a dynamic programming algorithm; determining voltage regulator switching schedules based at least in part on one or more of the initial or final voltage regulator tap settings; and switching the voltage regulator tap settings according to the voltage regulator switching schedules.

According to another example embodiment, an apparatus is provided. The apparatus includes at least one memory for storing data and computer-executable instructions; and at least one processor configured to access the at least one memory and further configured to execute the computer-executable instructions for controlling voltage and reactive power (VARs) in the distribution network by: estimating at least one present state associated with a distribution network; allocating one or more load zones in the distribution network; predicting load profiles of each zone for a predetermined time period; determining capacitor bank switching schedules for a predetermined time period based at least in part on the at least one present state and the predicted load profiles; switching capacitor banks according to the capacitor bank switching schedules; running a power flow algorithm to determine the predicted voltages over all nodes in a zone based at least in part on the predicted load profiles; determining an initial set of voltage regulator tap settings that flattens the predicted average voltage of all nodes in a zone over a given time period based at least in part on a linear relation between tap ratios and voltages; determining a final set of voltage regulator tap settings based on a dynamic programming algorithm; determining voltage regulator switching schedules based at least in part on one or more of the initial or final voltage regulator tap settings; and switching the voltage regulator tap settings according to the voltage regulator switching schedules.

Other embodiments and aspects of the invention are described in detail herein and are considered a part of the claimed inventions. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
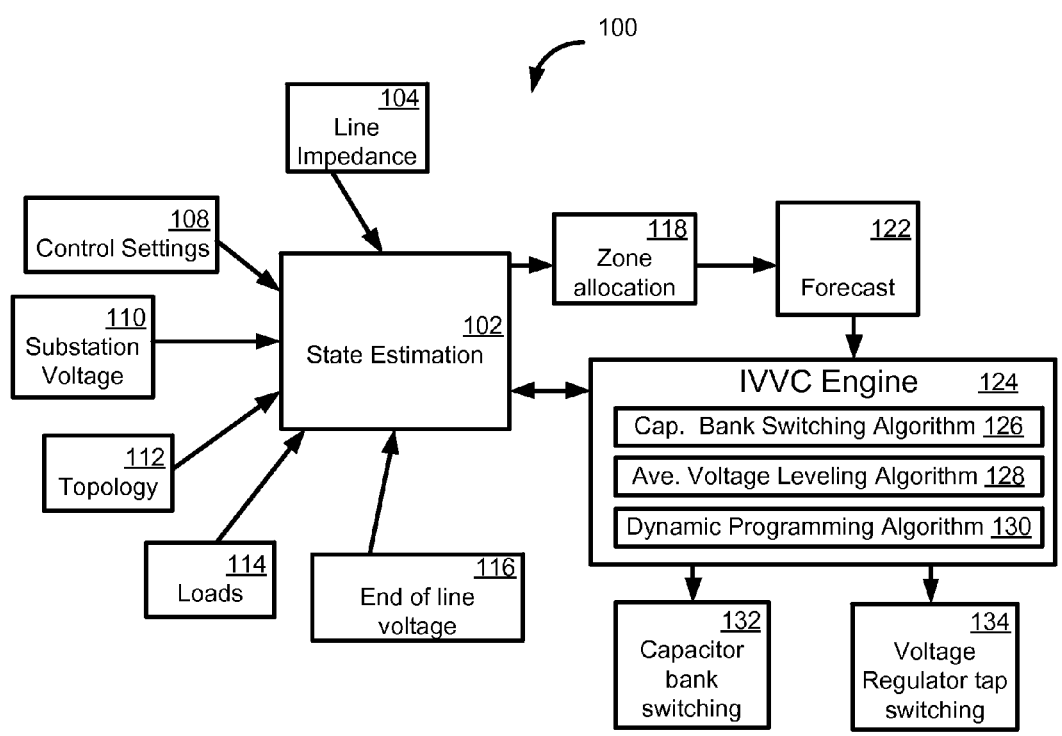
FIG. 1 is a block diagram of an illustrative state estimation and integrated volt/VAR control engine, according to an example embodiment of the invention.

In many power distribution networks, the voltage profile along the distribution feeder and the flow of reactive power (also known as VARs) on the feeder have traditionally been maintained by a combination of voltage regulators, switched capacitor banks, and load tap changers installed at various locations on the feeder and in its associated substation. Such devices have traditionally utilized fixed operational schedules, for example, based on the time of day or other local parameters. The resulting operations have been disjointed from one another, resulting in a decreased overall effectiveness of operation. Example embodiments of this invention present an approach to realize an integrated control and operation of these devices. Example embodiments of the invention may enable a more optimal operation of the distribution grid with a much faster computational time to determine a solution of the optimization problem. Example embodiments my utilize multiple algorithms to determine the optimum switching schedules, regulation, and coordination of the various voltage regulators, switched capacitor banks, and/or load tap changers associated with the power distribution system.

According to an example embodiment, the volt/voltsamps-reactive (VAR) optimization begins with distribution state estimation and load allocation to different zones/nodes of the network. In an example embodiment, a load forecasting model, based on pertinent system data and distribution system knowledge, is then used to predict the load for the next N hours of time period. According to an example embodiment, a integrated volt/VAR control (IVVC) engine may be utilized to solve a "Knapsack" problem to utilize information about the present states of the system and the forecasted reactive load to develop schedules for settings and switching states for the devices over a predetermined time period. The Knapsack problem may be defined as follows: suppose that a hitch-hiker has to fill up his knapsack (reactive power at the substation) by selecting among a finite number of objects (capacitor banks). Each object has weight or size and value (VAR). The hitch-hiker wants to maximize (minimize) the overall value of the objects in (the system power loss) the knapsack while keeping the overall weight below (above) a certain level (required reactive support).

In an example embodiment, finding an optimum solution to the Knapsack problem may be utilized as a new capacitor bank switching schedule and may provide input to the voltage regulator portion of the IVVC engine. According to an example embodiment, constraints on the number of device operations, voltage/current limits, etc. may be respected while formulating the switching states of the voltage regulator control devices.

In an example embodiment, an initial set of voltage regulator tap settings that flattens the predicted average voltage over all nodes in a zone over a given time period (i.e., 24 hours) may be determined by assuming a linear relation between tap ratios and voltages and taking advantage of treelike structure of distribution networks. For example, changes at the regulator may propagate to the child nodes and may eventually change the average voltage over all nodes. According to an example embodiment, the term "flattening," as used herein, relates to the network's time varying voltage change, which is related to the change in the load. For example, the load curve shape over a day may have the appearance of a mountain peaking around noon, and with constant current, the increased load may reduce the voltage, so that voltage curve looks like a valley. In an example embodiment of the invention, the tap ratio may be changed to "flatten" the voltage valley and provide a more steady average voltage, even as the load increases.

In accordance with example embodiments of the invention, optimal control of reactive power flow for improvements in the voltage profiles and for real power loss minimization may utilize real-time scheduling of device settings. According to an example embodiment, life degradation that occurs when the devices are switched frequently may be taken into account. In an example embodiment, a daily schedule may require running optimization algorithms as required to adjust future settings based on errors in the load forecast; however, the lifetime of a capacitor or voltage regulator may be dependent on the number of switching operations performed. For example, a capacitor bank is typically designed so that it can withstand 40,000-50,000 on/off switching cycles, which equates to a 20-year life, but if the controls for the cap bank allow this number of switching operations to occur over a six-year period, then the lifetime will be correspondingly reduced. According to an example embodiment, local or global control algorithms resulting in frequent switching of device setting are likely to be discarded in an attempt to prevent premature device failure. In an example embodiment, the IVVC may minimize the number of switching cycles while improving the power factor and/or minimizing losses.

According to an example embodiment of the invention, forecasting may be applied to minimize capacitor switching cycles. According to an example embodiment, a model of the distribution network may be applied to estimate the behavior of the network as though it were driven by the forecasted load. In an example embodiment, the impact of non-linearities may be estimated, and may be used to predict the behavior of dependent variables (i.e. outputs: node voltages, losses) of the modeled dynamic distribution network with respect to changes in the independent variables (i.e. control device settings).

According to an example embodiment, the algorithm for scheduling may run fast enough to provide updates in about 5 to about 15 minutes for large radial distribution networks. In an example embodiment, a coordinated optimized IVVC algorithm may be utilized that is computationally efficient at the expense of the global optimality (an approximate solution to the minimum cost of the objective function) for large radial distribution networks (e.g., those which contains thousands of nodes, tens of cap banks, and tens of load tap changers/voltage regulators.

Several factors may contribute to the increased efficiency of the example approach compared to dynamic programming of or genetic algorithms. First, according to an example embodiment, optimization of discrete capacitors and voltage regulators may be considered as separate but dependent problems. According to an example embodiment, modularity of the algorithms for different types of control devices may be applied to provide flexibility and to allow integration with other more optimal but less efficient algorithms as needed. In an example embodiment, the integrated algorithm may provide an optimal daily schedule for capacitor banks based on minimizing the total VARs at the head of the distribution substation. According to an example embodiment, the capacitor banks settings may be used to determine tap settings based on leveling the average voltage, and setting the average voltage to achieve some level of objective function cost minimization within appropriate sections of the distribution network.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 illustrates an example system 100 for optimizing the switching of capacitor banks 132 and for setting voltage regulator taps 134. According to an example embodiment, a state estimator 102 may be utilized to determine conditions associated with the power distribution network. According to an example embodiment, information such as line impedance 104, control settings 108, substation voltage 110, topology 112, loads 114, and/or end of line voltage 116 may be utilized by the state estimation block to determine the state of the network. In an example embodiment, the state estimator 102 may communicate with the IVVC engine 124 directly, or via additional intermediate blocks. For example, a zone allocation block 118 and/or a forecast block 122 may be utilized to customize the state estimation information for certain regions or zones of the network and/or certain periods in the future.

Figure 2:
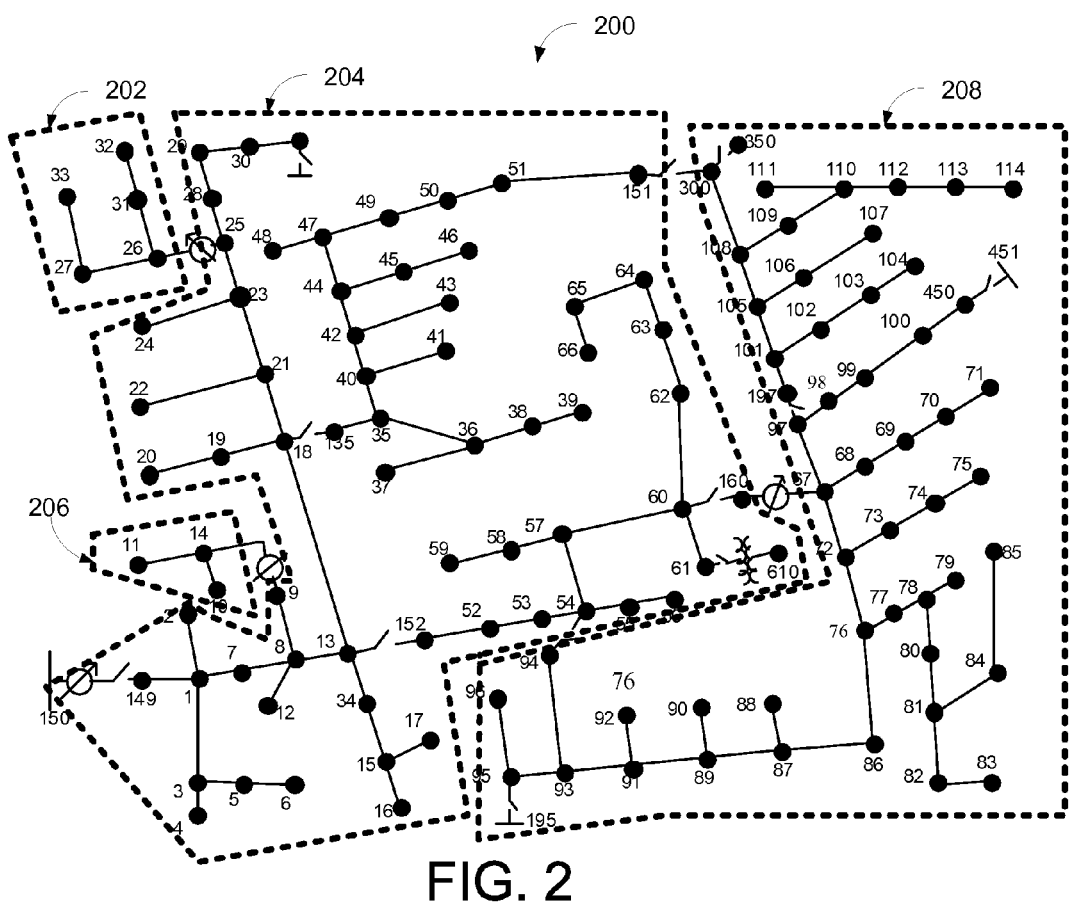
FIG. 2 is a block diagram of an illustrative example network, according to an example embodiment of the invention.

According to an example embodiment, the system 100 may include an IVVC engine 124, that may utilize a capacitor bank switching algorithm 126, an average voltage leveling or flattening algorithm 128, and/or a dynamic programming (DP) algorithm 130. According to an example embodiment, the IVVC engine 124, together with the associated blocks, may be utilized for optimizing the switching of capacitor banks 132 and for setting voltage regulator taps FIG. 2 depicts an example distribution network 200, according to an example embodiment of the invention. According to an example embodiment, the network 200 may include several microgrids, 202, 204, 206, and 208. In an example embodiment, the microgrids may be associated with the rest of the network, and attached with voltage regulators.

Figure 3:
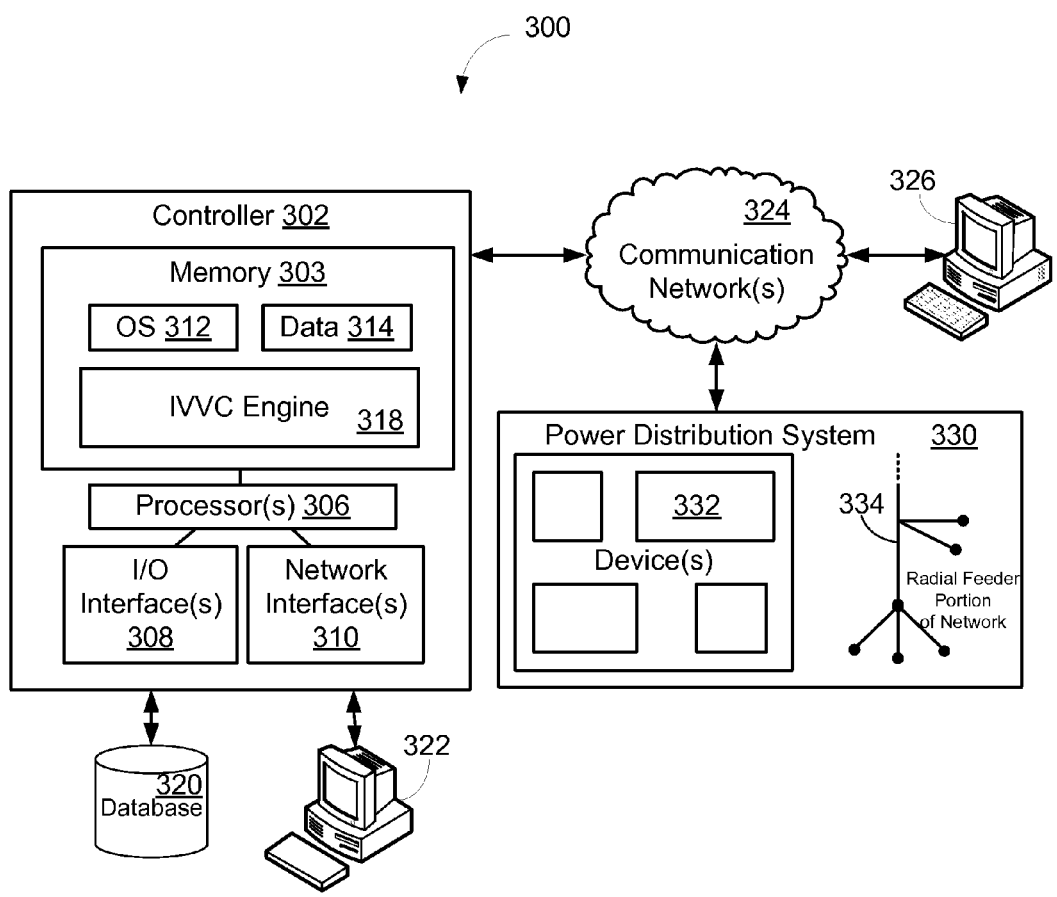
FIG. 3 is a block diagram of an illustrative example system, according to an example embodiment of the invention.

FIG. 3 depicts an example reduction processing system 300, according to an example embodiment of the invention. For example, the system 200 may include a controller 302. In an example embodiment, the controller 302 may include a memory 303, one or more processors 306, one or more input/output interfaces 308, and/or one or more network interfaces 310. In an example embodiment, the memory may include an operating system 312, data 314, and an IVVC engine module 318 (as in 124 of FIG. 1). According to an example embodiment, the system 300 may include a database 320 and/or a local workstation/display 322, operable for communication with the controller 302. In an example embodiment, the controller 302 may communicate with a power distribution system 330 via a communications network 324. According to an example embodiment, the power distribution system 330 may include devices 332, such as capacitor banks, voltage regulators, etc. In an example embodiment, the power distribution system 330 may include portions of the network 334, including radial feeders. In an example embodiment, a remote workstation/display may be in communication with the power distribution system 330 and/or the controller 302.

Figure 4:
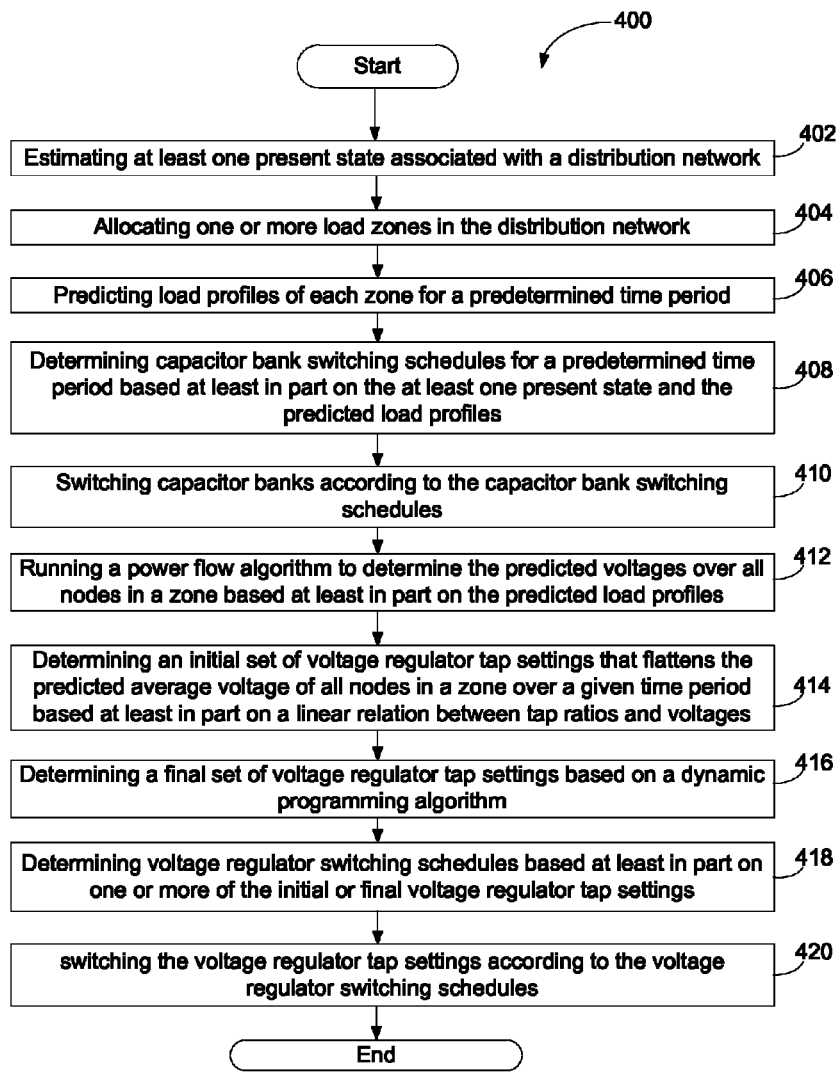
FIG. 4 is a flow diagram of an example method according to an example embodiment of the invention.

FIG. 4 shows an example flow diagram of a method 400, according to an example embodiment of the invention. The method 400 starts in block 402 and according to an example embodiment, includes estimating at least one present state associated with a distribution network. In block 404, the method 400 includes allocating one or more load zones in the distribution network. In block 406, the method 400 includes predicting load profiles of each zone for a predetermined time period. In block 408, the method 400 includes determining capacitor bank switching schedules for a predetermined time period based at least in part on the at least one present state and the predicted load profiles. In block 410, the method 400 includes switching capacitor banks according to the capacitor bank switching schedules. In block 412, the method 400 includes running a power flow algorithm to determine the predicted voltages over all nodes in a zone based at least in part on the predicted load profiles. In block 414, the method 400 includes determining an initial set of voltage regulator tap settings that flattens the predicted average voltage of all nodes in a zone over a given time period based at least in part on a linear relation between tap ratios and voltages. In block 416, the method 400 includes determining a final set of voltage regulator tap settings based on a dynamic programming algorithm. In block 418, the method 400 includes determining voltage regulator switching schedules based at least in part on one or more of the initial or final voltage regulator tap settings. In block 420, the method 400 includes switching the voltage regulator tap settings according to the voltage regulator switching schedules. The method 400 ends after block 420.

Figure 5:
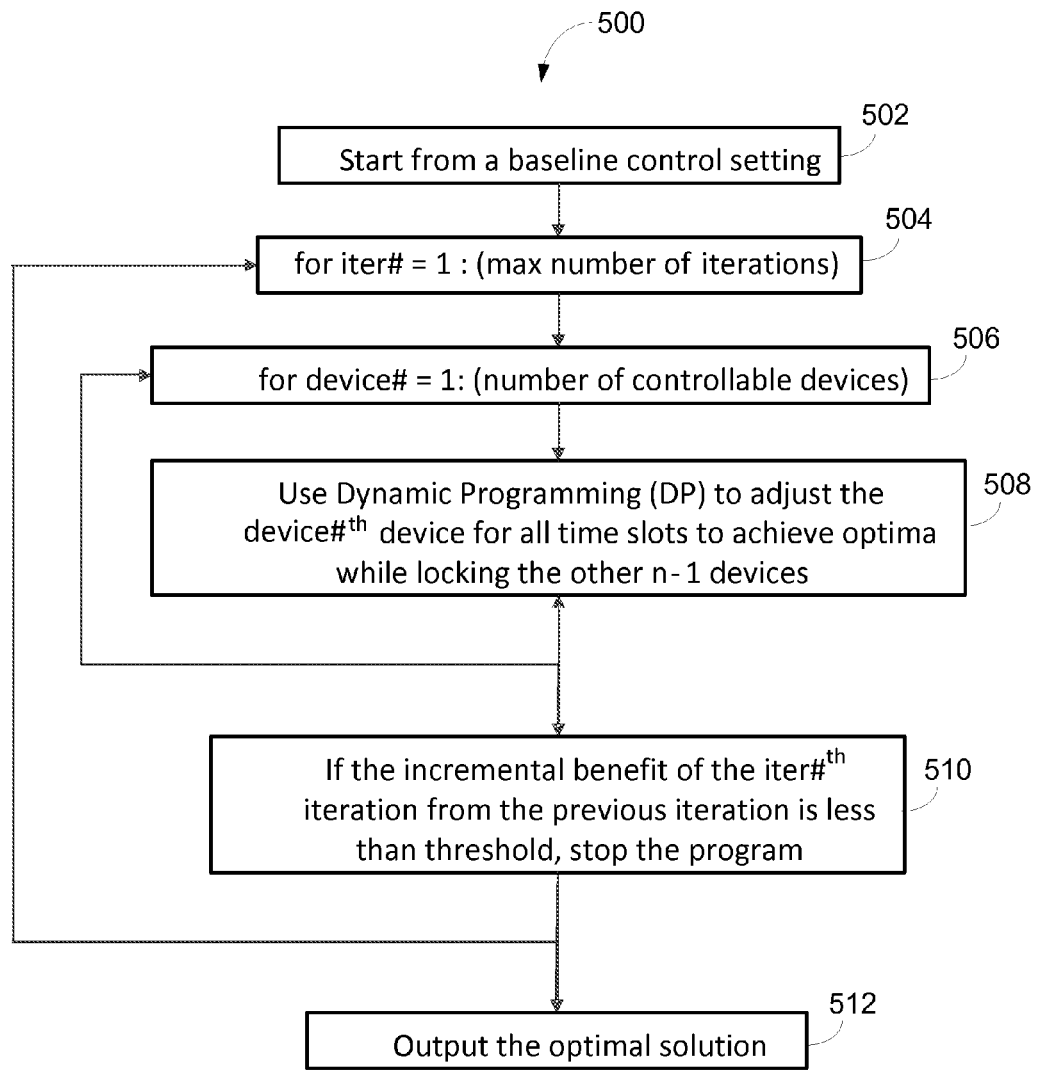
FIG. 5 is a flow diagram of another example method according to an example embodiment of the invention.

FIG. 5 depicts an example use of a dynamic programming (DP) algorithm for controlling devices in the network. According to an example embodiment, the voltage regulator tap settings may be set using a DP algorithm. In an example embodiment, DP is an optimization method that may be used for generation unit commitment. For example, unit commitment may involve scheduling available generation units (for example, which locations should be receiving power and which locations should not) in a power system for the next N hours (for example, 8 hours) to both meet the load requirements and to achieve the minimum total operational cost. According to an example embodiment, the dynamic programming may be described as follows: for the Kth hour, there are a limited number of unit combinations, and a minimum cost up to this hour since the 1st hour is desired to be calculated. The following equation may be utilized:

$$F\text{cost}(K,I) = \min[P\text{cost}(K,I) + S\text{cost}(K-1,L:K,I) + F\text{cost}(K-1,L)],$$

where "K" is the hour number, "I" and "L" represent two different unit combinations, Fcost(K,I) represents the accumulated total cost in the Kth hour when combination "I" is used in this hour, Fcost(K−1,L) represents the accumulated total cost during the previous hour (K−1) when combination "L" was used, Scost(K−1,L:K,I) represents the cost associated with the transition from combination "L" in the new combination "I", and Pcost(K,I) means the cost that will occur in this Kth hour due to the operation with combination "I". In an example embodiment, for each possible combination "I", its associated accumulated cost Fcost(K,I) is evaluated given that Fcost(K−1,L) is already available. According to an example embodiment, this evaluation continues until the final hour is reached.

According to an example embodiment involving IVVC optimization, a similar DP process, as described above may be utilized for scheduling of all available units (e.g., capacitor banks, voltage regulators) for the next N hours to achieve the optimal system performance (e.g., minimum total energy loss). According to an example embodiment, in each hour there are a number of possible scheduling combinations. In an example embodiment, versions of the DP algorithm may be utilized to address certain special features of the IVVC problem. For example, the IVVC algorithm 500, as shown in FIG. 5 may include the DP to find an optimal solution. According to an example embodiment, the algorithm 500 may start in block 502 from a baseline control setting. An outer loop may then include blocks 504, 506, 508, and 510, with an inner loop including blocks 506 and 508. For example, the outer loop may iterate over "i"—the maximum number of iteration for the algorithm, and the inner loop may iterate over "j"—the number of controllable devices. In an example embodiment, in 508, DP may be used to adjust the jth device for all time slots to achieve optima while locking all of the other N−1 devices. Then in block 510, and according to an example embodiment, the incremental benefit of the ith iteration from the previous iteration may be evaluated, and if it is less than a predetermined threshold, then the algorithm 500 may stop and output an optimal solution in block 512.

According to example embodiments of the invention, expert knowledge may be used in the DP method to limit the number of states to search in each stage. For example, the tap positions of a tap changer may be confined to 9 positions around the "should-be" position based on the actual load condition (whereas the total number of states for each tap changer may be 33 otherwise). According to an example embodiment, a load flow may be determined before every DP to acquire a basic idea of the "should-be" tap position. For example, a tap position too far away from the "should-be" position may result in voltage violations, and may not be preferred. According to an example embodiment, a memory size of 6 may provide an optimal use of memory space. According to an example embodiment, in each iteration, the order of adjusting devices may be randomly generated to avoid being trapped in a limit cycle.

Accordingly, example embodiments of the invention can provide the technical effects of creating integrated volt/VAR control in power distribution networks that can minimize line losses. Example embodiments of the invention can also provide the technical effects of creating certain systems, methods, and apparatus that can minimize load through conservation voltage reduction. Example embodiments of the invention can also provide the technical effects of creating certain systems, methods, and apparatus that can increase power factor greater than about 0.98 and flatten/adjust voltage to desired setting.

In example embodiments of the invention, the integrated volt/VAR control system 100 and the reduction processing system 300 may include any number of hardware and/or software applications that are executed to facilitate any of the operations.

In example embodiments, one or more I/O interfaces may facilitate communication between integrated volt/VAR control system 100 and the reduction processing system 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the integrated volt/VAR control system 100 and the reduction processing system 300. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the integrated volt/VAR control system 100 and the reduction processing system 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, embodiments of the invention may include the integrated volt/VAR control system 100 and the reduction processing system 300 with more or less of the components illustrated in FIGS. 1 and 3.

Certain embodiments of the invention are described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for controlling voltage and reactive power in a distribution network, the method comprising:
   estimating at least one present state associated with a distribution network;
   allocating one or more load zones in the distribution network;
   predicting load profiles of each zone for a predetermined time period;
   determining capacitor bank switching schedules for a predetermined time period based at least in part on the at least one present state and the predicted load profiles;
   switching capacitor banks according to the capacitor bank switching schedules;
   running a power flow algorithm to determine the predicted voltages over all nodes in a zone based at least in part on the predicted load profiles;
   determining an initial set of voltage regulator tap settings that flattens the predicted average voltage of all nodes in a zone over a given time period based at least in part on a linear relation between tap ratios and voltages;
   determining a final set of voltage regulator tap settings based on a dynamic programming algorithm;
   determining voltage regulator switching schedules based at least in part on one or more of the initial or final voltage regulator tap settings; and
   switching the voltage regulator tap settings according to the voltage regulator switching schedules.

2. The method of claim 1, wherein estimating the at least one present state comprises estimating at least one of voltage, power factor or reactive loads at nodes of the distribution network.

3. The method of claim 1, wherein allocating one or more load zones comprises grouping nodes by control sub-systems.

4. The method of claim 1, wherein the one or more load zones are treated as nodes for predicting load profiles.

5. The method of claim 1, wherein predicting the load profiles of each zone is based at least in part on a load forecasting model.

6. The method of claim 1, further comprising:
   updating estimates of the at least one present state;
   updating capacitor bank switching schedules; and
   updating voltage tap setting switching schedules.

7. The method of claim 1, wherein determining capacitor bank switching schedules is further based at least in part on one of device operation frequency, device volt-amps reactive (VARs), network voltage limits, and network VAR deficit.

8. The method of claim 1, wherein determining voltage regulator switching schedules is further based at least in part on a dynamic programming algorithm and on one or more of device operation frequency, network voltage limits, or leveling the average voltage level in at least one control subsystem.

9. A system comprising:
   at least one power distribution network comprising one or more switchable capacitor banks and one or more adjustable voltage regulators; and
   at least one memory for storing data and computer-executable instructions; and at least one processor configured to access the at least one memory and further configured to execute the computer-executable instructions for controlling voltage and reactive power (VARs) in the distribution network by:
   estimating at least one present state associated with a distribution network;
   allocating one or more load zones in the distribution network;
   predicting load profiles of each zone for a predetermined time period;
   determining capacitor bank switching schedules for a predetermined time period based at least in part on the at least one present state and the predicted load profiles;
   switching capacitor banks according to the capacitor bank switching schedules;
   running a power flow algorithm to determine the predicted voltages over all nodes in a zone based at least in part on the predicted load profiles;
   determining an initial set of voltage regulator tap settings that flattens the predicted average voltage of all nodes in a zone over a given time period based at least in part on a linear relation between tap ratios and voltages;
   determining a final set of voltage regulator tap settings based on a dynamic programming algorithm;
   determining voltage regulator switching schedules based at least in part on one or more of the initial or final voltage regulator tap settings; and
   switching the voltage regulator tap settings according to the voltage regulator switching schedules.

10. The system of claim 9, wherein estimating the at least one present state comprises estimating at least one of voltage, power factor or reactive loads at nodes of the distribution network.

11. The system of claim 9, wherein allocating one or more load zones comprises grouping nodes by control sub-systems.

12. The system of claim 9, wherein the one or more load zones are treated as nodes for predicting the load profiles.

13. The system of claim 9, wherein predicting the load profiles is based at least in part on a load forecasting model.

14. The system of claim 9, further comprising updating estimates of the at least one present state and updating capacitor bank switching schedules.

15. The system of claim 9, wherein determining capacitor bank switching schedules is further based at least in part on one or more of device operation frequency, device volt-amp reactive (VAR), network voltage limits, or network VAR deficit.

16. The system of claim 9, wherein determining voltage regulator switching schedules is further based at least in part on a dynamic programming algorithm and on one or more of device operation frequency, network voltage limits, or leveling the average voltage level in at least one control sub-system.

17. An apparatus comprising:
at least one memory for storing data and computer-executable instructions; and at least one processor configured to access the at least one memory and further configured to execute the computer-executable instructions for controlling voltage and reactive power (VARs) in the distribution network by:
estimating at least one present state associated with a distribution network;
allocating one or more load zones in the distribution network;
predicting load profiles of each zone for a predetermined time period;
determining capacitor bank switching schedules for a predetermined time period based at least in part on the at least one present state and the predicted load profiles;
switching capacitor banks according to the capacitor bank switching schedules;
running a power flow algorithm to determine the predicted voltages over all nodes in a zone based at least in part on the predicted load profiles;
determining an initial set of voltage regulator tap settings that flattens the predicted average voltage of all nodes in a zone over a given time period based at least in part on a linear relation between tap ratios and voltages
determining a final set of voltage regulator tap settings based on a dynamic programming algorithm;
determining voltage regulator switching schedules based at least in part on one or more of the initial or final voltage regulator tap settings; and
switching the voltage regulator tap settings according to the voltage regulator switching schedules.

18. The apparatus of claim 17, wherein estimating the at least one state comprises estimating at least one of voltage, power factor or reactive loads at nodes of the distribution network.

19. The apparatus of claim 17, wherein allocating one or more load zones comprises grouping nodes by control sub-systems.

20. The apparatus of claim 17, wherein predicting the load profiles is based at least in part on a load forecasting model.

21. The apparatus of claim 17, further comprising updating estimates of the at least one present state and updating capacitor bank switching schedules.

22. The apparatus of claim 17, wherein determining capacitor bank switching schedules is further based at least in part on one or more of device operation frequency, device VARs, network voltage limits, or network VAR deficit.

23. The apparatus of claim 17, wherein determining voltage regulator switching schedules is further based at least in part on a dynamic programming algorithm and on one or more of device operation frequency, network voltage limits, or leveling the average voltage level in at least one control sub-system.

* * * * *